United States Patent
Bollweg et al.

(10) Patent No.: US 6,398,294 B1
(45) Date of Patent: Jun. 4, 2002

(54) EASY ACCESS HVAC MODULE ON WORK VEHICLE

(75) Inventors: Nicholas Edward Bollweg, Galena, IL (US); David Joseph Klas, Dyersville, IA (US); Mark Wayne Stender; Martin Lavern Ruhter, both of Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/587,925

(22) Filed: Jun. 6, 2000

(51) Int. Cl.[7] .............................. B60J 7/00; B60K 37/00; B60N 2/00; B60N 3/00; B60R 27/00

(52) U.S. Cl. .................................................. 296/190.09

(58) Field of Search ........................ 296/190.08, 190.09, 296/190.01

(56) References Cited

U.S. PATENT DOCUMENTS

| | | | |
|---|---|---|---|
| 4,088,364 A | | 5/1978 | Termont ...................... 296/28 |
| 4,120,527 A | * | 10/1978 | Lawrence |
| 4,417,759 A | * | 11/1983 | Pierrot, III et al. |
| 4,531,453 A | | 7/1985 | Warman et al. .............. 98/2.11 |
| 4,612,975 A | | 9/1986 | Ikari ........................... 165/43 |
| 5,119,718 A | | 6/1992 | Wagner et al. .............. 454/158 |
| 5,308,279 A | | 5/1994 | Grinberg .................... 454/139 |
| 5,906,411 A | * | 5/1999 | Stauffer et al. |

OTHER PUBLICATIONS

Deere & Company brochure entitled 548G–II 648G–II and 748–II Skidders, printed in the U.S.A., 1998.
Deere & Company Operator's Manual entitled "640G Skidder and 648G Grapple Skidder," omt 153911 Issue B5, front cover, introduction and pp. 65–5–65–6, printed in the U.S.A., Mar./1995.
SAE Technical Paper Series 860744 entitled "Off–Highway HVAC—Evolution to the 1990's—Ideas and Lessons from Parallel Fields" by Matthew T. Bartlett, printed in the U.S.A., 1986.

* cited by examiner

*Primary Examiner*—Stephen T. Gordon
*Assistant Examiner*—Scott Carpenter

(57) ABSTRACT

The operator's station of an off road work vehicle comprises an operator's compartment having a control console. The operators compartment defining an interior space in which the operator is positioned. A HVAC module is located in the operator's compartment along the rear wall. The rear wall of the operator's compartment is provided with an access opening through which the major components of the HVAC module can be serviced and removed. The access opening is provided with an access door that is hingedly coupled to the operator's compartment about a transverse hinge axis. The control console is provided with a console wall having a finished exterior surface that is exposed to the interior space. The HVAC module is also provided with an exterior wall having a finished exterior surface that is also exposed to the interior space and adjoins the console wall. The finished exterior surface of the console walls matches the exterior finished surface of the exterior wall.

21 Claims, 3 Drawing Sheets ized by cycling the compressor clutch and/or opening the engine coolant control valve. Partial reheat air mix systems have also been used where air blend doors are used to control the flow of air to be conditioned across the heat exchangers.

EASY ACCESS HVAC MODULE ON WORK VEHICLE

BACKGROUND OF THE INVENTION

1. Field of the Invention

The present invention is directed to the operator's station of an off road work vehicle having a HVAC module located in the operator's station that can be readily accessed from outside the operator's station to service and maintain the HVAC module.

2. Description of the Prior Art

Most off road work vehicles are provided with heating ventilating and air conditioning (HVAC) systems to provide operator comfort in a variety of climatic conditions. These HVAC systems may be of the series reheat variety. That is total system airflow passes through both the cooling heat exchanger (evaporator core) and the heating heat exchanger (heater core) all of the time. Temperature control is accomplished by cycling the compressor clutch and/or opening the engine coolant control valve. Partial reheat air mix systems have also been used where air blend doors are used to control the flow of air to be conditioned across the heat exchangers.

In some installations, the air conditioning component of the HVAC system has been located in the roof structure of the work vehicle and the heating component of the HVAC system has been located on the floor in the operator's station. This can lead to the duplication of components. It has also been proposed to have modular HVAC systems located on the floor of the work vehicle with air vents directing conditioned air to the roof structure and to floor vents. The roof structure is also provided with vents that direct the conditioned air downwardly along the sides of the vehicle and towards the operator.

Access doors have been provided on the exterior of work vehicles to provide access to air filters through which ambient air is drawn. This allows an operator to clean or replace the filter from the outside the operator's compartment. By keeping the dirty filter outside the operator's compartment this source of dirt is eliminated. These filters may be located on the battery box of grapple skidders. The battery box having an access door for the batteries and the filter that is located below the rear window of the skidder. This access door is hingedly coupled to the vehicle along a transverse axis.

SUMMARY

It is an object of the present invention to provide a HVAC module that can readily serviced from outside the operator's station to which it is associated.

It is another object of the present invention to provide a compact HVAC module that forms part of the finished exterior wall of a console located in the operator's compartment.

The operator's station of an off road work vehicle is provided with an operator's compartment having a control console having a console wall with a finished exterior surface to which the operator is exposed. A compact HVAC module is located in the operator's compartment and is provided with an exterior wall having a finished exterior surface to which the operator is exposed that is identical to the finished exterior surface of the console wall. The HVAC module extends rearwardly from the finished exterior wall of the console to the rear of the operator's compartment. The HVAC module extends rearwardly below the rear window of the operator's station. The main components of the HVAC module (blower, evaporator core and heater core) can be serviced, maintained and replaced from outside the operator's station through an access opening formed in the rear wall below the rear window. The HVAC module provides conditioned air to the operator's compartment. By locating the access opening below the rear window the HVAC module can be more easily serviced. The access opening is provided with an access door that is hingedly coupled to the operator's station. The door is mounted to hinges defining a transverse hinge axis.

DETAILED DESCRIPTION

Figure 1:
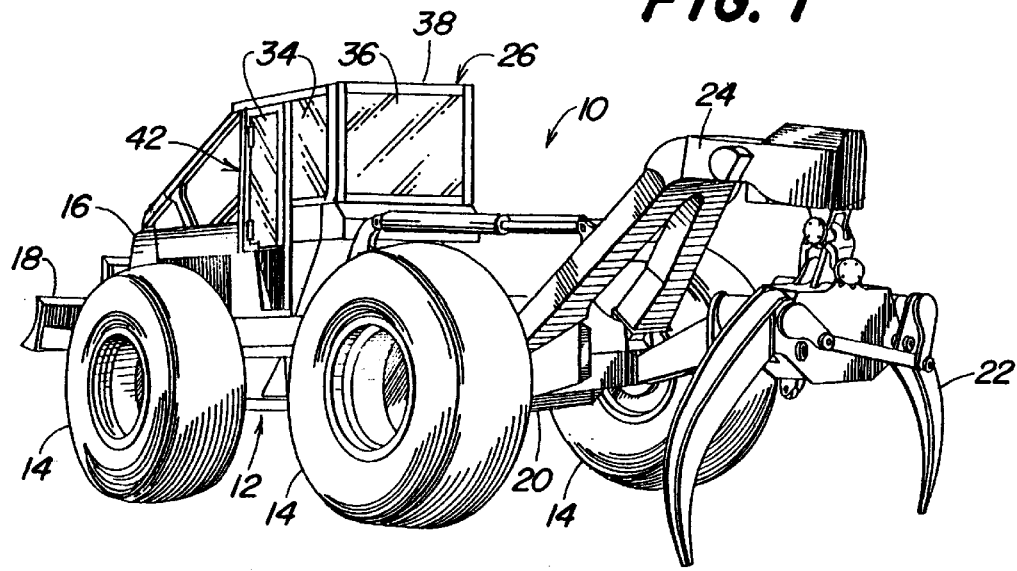
FIG. 1 is a rear perspective view of grapple skidder.
Figure 4:
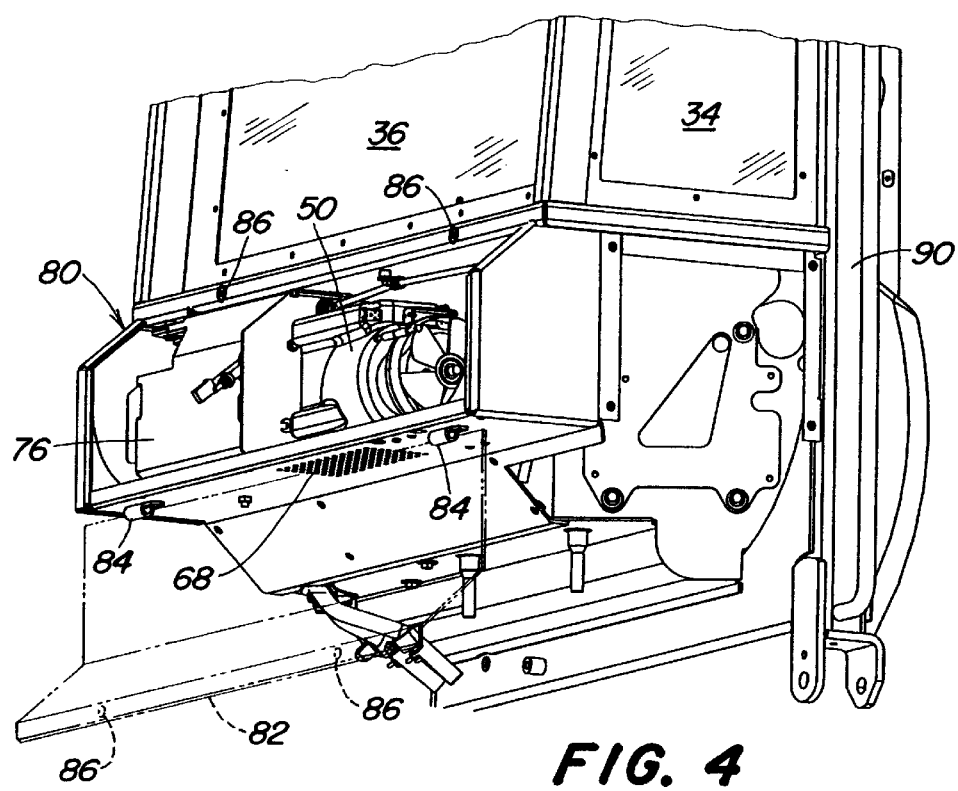
FIG. 4 is a partial rear perspective view of the operator's station looking up.

FIG. 1 illustrates an off road work vehicle which in the present example is a grapple skidder 10. The grapple skidder 10 is provided with a supporting frame 12 having ground engaging means 14 for supporting and propelling the vehicle. Although the illustrated embodiment discloses a vehicle having ground engaging wheels, the present invention could also be used on track laying vehicles of either the steel tracked type or the rubber tracked type. The supporting frame 12 is provided with a front portion 16 having a front mounted stacking blade 18, and a rear portion 20 having a rear mounted grapple 22 and associated grapple linkage 24. The grapple 22 and the associated grapple linkage 24 form a work implement for performing a work operation, that is grabbing and dragging logs. As the grapple skidder is an articulated vehicle, the front portion 16 and the rear portion 20 are pivotally coupled to one another about a vertical pivot axis. The operation of the vehicle is controlled from an operator's station 26. The operator's station in the illustrated embodiment is an operators enclosed cab. However, the present invention also finds utility with canopy style operator's stations having front and rear windows and open sides.

The operator's station 26 is provided with an operator's compartment 28 having a console 30. The console is provided with operator controls 46 for controlling the grapple 22 and associated grapple linkage 24. The console is formed from plastic and is provided with a console wall 31 having a finished exterior surface to which the operator is exposed. The operator's compartment 28 defines an interior space from which the work vehicle is controlled. The operator is seated in an operator's seat, not shown, located in this interior space. The operator's compartment in the illustrated embodiment is provided with a front window 32, side windows 34, a rear window 36, a roof structure 38 and a floor 40. A door 42 may form part of the side window structure.

A compact HVAC module 44 is located in the operator's compartment and forms part of the console 30. The exterior wall 45 of the HVAC module 44 has a finished exterior surface that is identical to the finished exterior surface of the console wall 31. In this way exterior wall 45 of the HVAC module provides a finished surface defining the interior space of the operator's compartment. Although the edges of the HVAC module 44 overlap with the rest of the console 30, a small gap 48 is formed between these surfaces.

The HVAC module 44 is located below the rear window 36 in pneumatic communication with the interior space of the operator's compartment 28. The HVAC module 44 controls and maintains the environment in the interior space. The HVAC module 44 of the illustrated embodiment is provided with a powered precleaner 50 for receiving fresh outside air. The powered precleaner 50 and HVAC module 44 draw outside air into the operator's compartment through an air vent 68. The powered precleaner removes the vast majority of contaminants from the outside air before directing the air to a fresh air filter, not shown, located pneumatically upstream from the inlet for the HVAC module 44. Interior air from the operator's compartment 28 is recirculated to the HVAC module 44. Recirculated air for the HVAC module 44 is drawn through openings for the control levers 46, air vent 70 and through gap 48. The recirculated is pulled through a recirculated air filter located pneumatically upstream form the HVAC module 44. After the recirculated air and the outside air have passed through their respective filters both air streams are mixed upon entering the HVAC module 44.

Conditioned air from the HVAC module 44 is directed through a first conditioned air duct 52 vertically upward to the roof structure 38. The roof structure 38 defines a first air path 54 and a second air path 56. The flow of conditioned air from the first conditioned air duct 52 is divided by an air flow divider 58 between the first path 54 and the second path 56. The air flow divider 58 comprises a section of duct work having a V-shaped cross section that is molded into the upper layer of the interior roof structure. The first path 54 is shorter than the second path 56. This path 54 is provided with three air vents 60, only one shown, for directing conditioned air into the interior space of the operator's compartment 28. The illustrated vent 60 directs the conditioned air flow downwardly along the interior surface of the front window 32. The second and third vents 60 of the first air flow path 54, not shown, direct the conditioned air flow downwardly along the interior surface of the adjacent side window 34 and directly onto the operator. Similarly, the second air flow path 56 is provided with air vents 62, only one shown. However, this flow path 56 is provided with five air vents 62. The first air vent 62, not shown, directs conditioned air downwardly along the rear window 36. The second air vent 62 is located in the right rear corner of the roof structure 38 for directing conditioned air downwardly to the operator. The third air vent 62 directs conditioned air downwardly along the adjacent side window 34. The illustrated fourth air vent 62 directs conditioned air downwardly along the front window 34. The fifth air vent directs conditioned air directly onto the operator.

Figure 2:
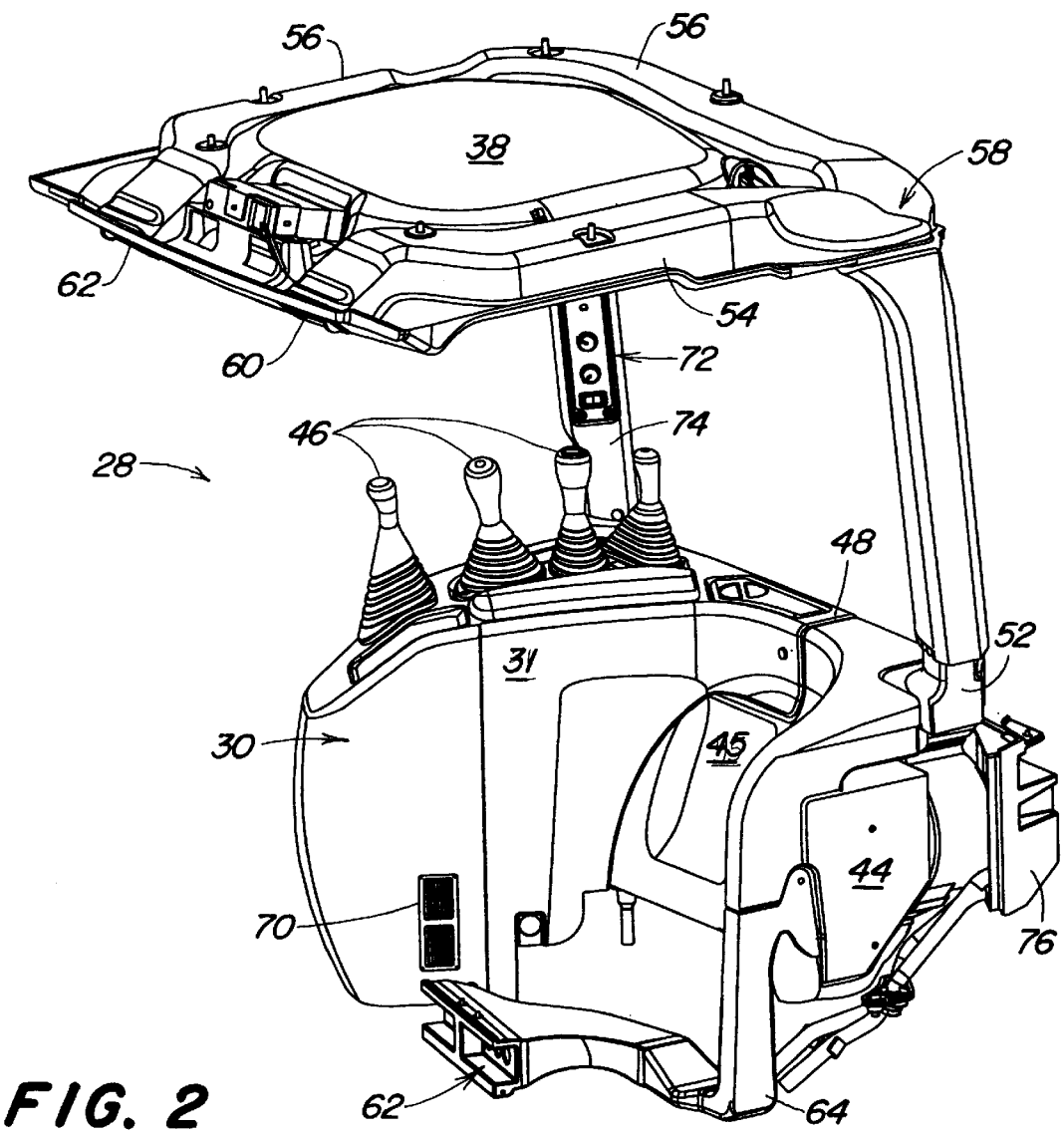
FIG. 2 is a perspective front view of the operator's compartment of the present invention.
Figure 3:
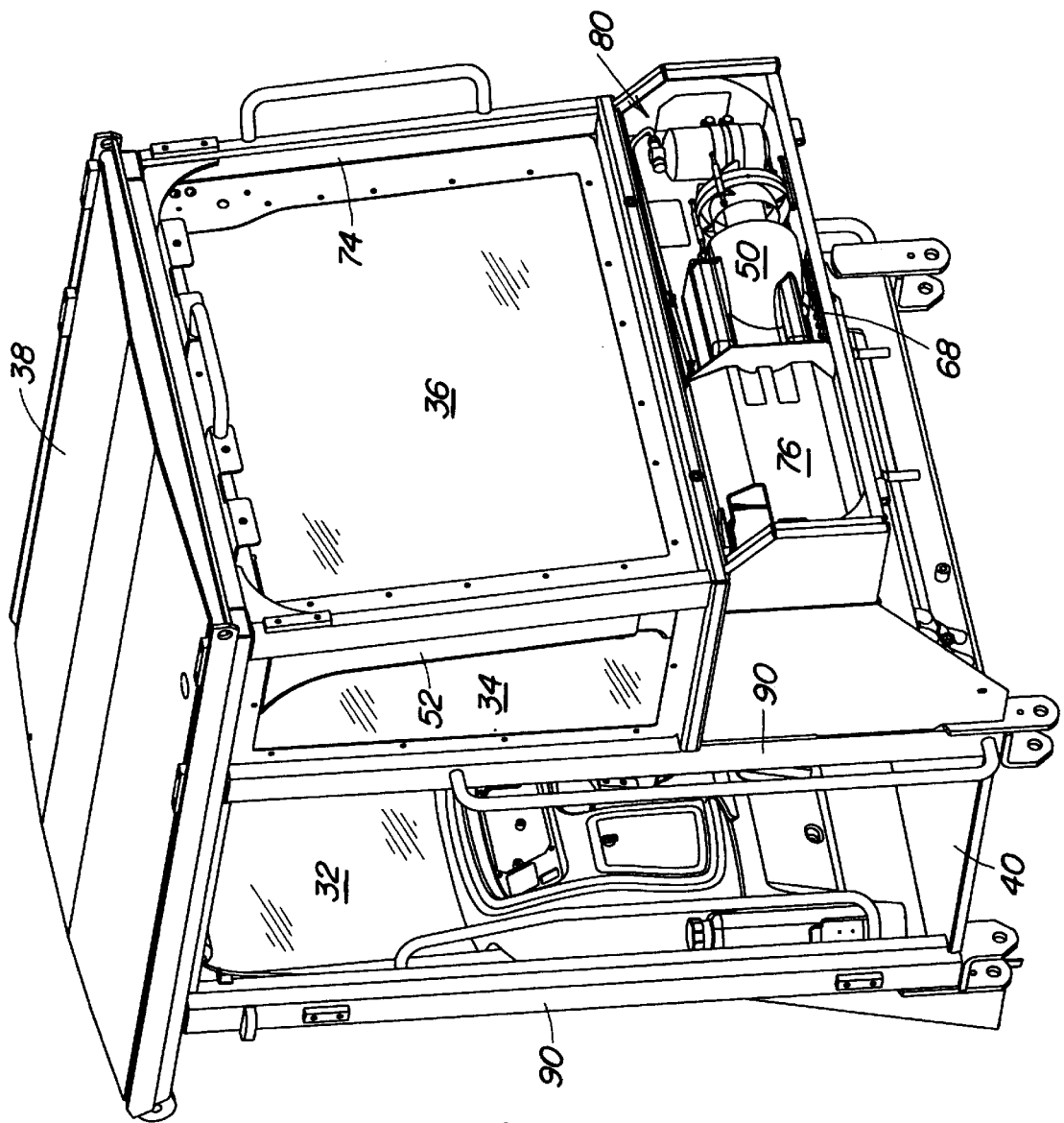
FIG. 3 is a rear perspective view of the operator's station looking down.

It should be noted that the roof structure 38 illustrated in FIG. 2, is the interior portion of the roof structure carrying the air flow paths 54 and 56. This interior portion of the roof structure 38 is mounted to the interior surface of a rigid exterior roof portion that is illustrated in FIG. 3. Typically the interior portion of the roof structure 38 is made of plastic and other lightweight materials. The interior portion comprises at least two layers that are welded together with the air flow paths being formed between the opposed layers. The exterior portion of the roof structure 38 is made of sheet metal or high density plastic materials.

A second conditioned air duct 64 extends from the HVAC module 48 forwardly and downwardly. This air duct 64 terminates in an air venting structure 66 located below the operators seat. This air vent structure 66 directs conditioned air along the floor 40 of the operator's station for warming the operator's lower extremities.

The controls 72 for controlling the HVAC module 44 are located on the right rear corner post 74 of the operator's compartment 28.

The rear of the operator's compartment 28 is provided with an access opening 80 through which the major components of the HVAC module 44 and the precleaner 50 can be serviced, maintained and/or replaced. A plastic HVAC module cover 76 that is held in place by elastic straps protects these major components. The access opening 80 is sized to permit removal and replacement of the major components of the HVAC module 44 from outside the operator's compartment. These major components include the blower, the evaporator core and the heater core. In addition, the powered precleaner 50 can also be removed through this access opening 80 as required. A steel access door 82 closes the access opening 80 and protects the HVAC module 44 and precleaner 50 from the elements. This door 82 is hingedly coupled to the operator's station by hinges 84. This allows the door 82 to be pivoted about a transverse pivot axis. The door 82 is held in its closed position by two bolts passing through holes 86 located in the top edge of the access door 82 and the top edge of the operator's compartment 28. These bolts are provided with enlarged heads, similar to wing nuts, that easily accommodate an operator's hands for opening the access door without tools. A roll over protection system (ROPS) comprising vertical posts 90 protects the operator.

In installing the HVAC module 44 in the operator's station 26, the module is mounted to the floor 40 of the operator's station as a unit. The HVAC module is inserted through the rear window opening and anchored to the floor. The console 30 is installed after the HVAC module 44.

The present invention should not be limited by the above described embodiment, but should be limited solely by the claims that follow.

We claim:

1. An operator's station for an off road work vehicle, the operator's station comprising:
   an operator's compartment having an interior space from which an operator operates the off road work vehicle, the operator's compartment having a front window, a rear window, a roof and a floor, the operator's compartment also having an access opening located below the rear window;
   a HVAC module is housed in the operator's compartment in pneumatic communication with the interior of the operator's compartment, the HVAC module having major components that can be serviced and removed through the access opening.

2. An operator's station as defined in claim 1 wherein a first conditioned air duct is in pneumatic communication with the HVAC module and directs conditioned air to the interior space of the operator's compartment.

3. An operator's station as defined by claim 2 wherein the first conditioned air duct directs the conditioned air vertically to the roof and from which the conditioned air is distributed to the interior space of the operator's compartment through air vents mounted in the roof.

4. An operator's station as defined by claim 3 wherein the roof structure is provided with an air flow divider that receives the conditioned air from the first duct and divides the flow of conditioned air between a first flow path in the roof and a second flow path in the roof.

5. An operator's station as defined by claim 4 wherein the first flow path communicates with fewer air vents that the second flow path, the air flow divider distributes the conditioned air unevenly between the first flow path and the second flow path so that the majority of the conditioned air is directed to the second flow path.

6. An operator's station as defined by claim 5 further comprising as second conditioned air duct for directing conditioned air to the interior space of the operator's compartment, the conditioned air from the second conditioned air duct is directed to the floor.

7. An operator's station as defined by claim 6 further comprising a console on which operators controls are mounted, the console having a console wall having a finished exterior surface that is exposed to the interior space, the console also having openings through which air is recirculated to the HVAC module.

8. An operator's station as defined by claim 7 wherein the operator's compartment has an exterior air vent for directing fresh air to the HVAC module.

9. An operator's station as defined by claim 8 wherein the HVAC module is provided with an exterior wall having a finished exterior surface that is exposed to the interior space, the finished exterior surface of the exterior wall is identical to the finished exterior surface of the console wall.

10. An operator's station as defined by claim 9 wherein the operator's compartment is provided with an access door for closing the access opening the access door is hinged to the operator's compartement.

11. An operator's station as defined by claim 10 wherein the access door pivots about a transverse axis located below the access opening.

12. An off road work vehicle, the work vehicle comprising:
    a supporting frame;
    ground engaging means extending from the supporting frame for propelling the vehicle;
    a work implement coupled to the supporting frame for performing a work operation;
    an operator's station is mounted to the supporting frame for controlling the work vehicle, the operator's station having a roof, a floor, a front window and a rear window, the roof, floor, front window and rear window defining an with an operator's compartment having an interior space, a HVAG module for providing conditioned air into the interior space of the operator's compartement is housed in the operator's compartement, the HVAC module having major components, the operator's compartement is provided with an access opening through which the major components of the HVAC module can be serviced and removed, the access opening being located below the rear window.

13. A work vehicle as defined in claim 12 wherein a first conditioned air duct is in pneumatic communication with the HVAC module and directs conditioned air into the interior space of the operator's compartment.

14. A work vehicle as defined by claim 13 wherein the first conditioned air duct directs the conditioned air vertically to the roof and from which the conditioned air is distributed into the operator's compartment through air vents mounted in the roof.

15. A work vehicle as defined by claim 14 wherein the roof is provided with an air flow divider that receives the conditioned air from the first duct and divides the flow of conditioned air between a first flow path in the roof and a second flow path in the roof.

16. A work vehicle as defined by claim 15 wherein the first flow path communicates with fewer air vents that the second flow path, the air flow divider distributes the conditioned air unevenly between the first flow path and the second flow path so that the majority of the conditioned air is directed to the second flow path.

17. A work vehicle as defined by claim 16 wherein a second conditioned air duct directs conditioned air from the HVAC module to the floor.

18. A work vehicle as defined by claim 17 wherein the console is provided with a console wall having a finished exterior surface that is exposed to the interior pace, the console also having openings through which air is recirculated to the HVAC module.

19. A work vehicle as defined by claim 18 wherein the operator's compartment has an exterior air vent for directing fresh air to the HVAC module.

20. A work vehicle as defined by claim 19 wherein the operators compartment is provided with an access door for closing the access opening the access door is hingedly coupled to the operator's compartment about a transverse axis.

21. An off road work vehicle, the work vehicle comprising:
    a supporting frame;
    ground engaging means extending from the supporting frame for propelling the vehicle;
    a work implement coupled to the supporting frame for performing a work operation;
    an operator's station is mounted to the supporting frame for controlling the work vehicle, the operator's station having a roof, a floor, a front window and a rear window, the roof, floor, front window and rear window defining an with an operator's compartment having an interior space, a HVAC module for providing conditioned air into the interior space of the operator's compartement is housed in the operator's compartement, the operator's compartement is provided with an access opening through which the HVAC module can be serviced and removed, the access opening being located below the rear window, the operator's compartment is also provided with a console having controls for controlling the work implement, the console having a console wall that is provided with a finished exterior surface that is exposed to the interior space, the HVAC module also having an exterior wall having a finished exterior surface that is exposed to the interior space and adjoins the console wall.

* * * * *